E. D. LEVY & H. W. JACOBS.
TANK CAR.
APPLICATION FILED APR. 23, 1917.
1,251,978.
Patented Jan. 1, 1918.
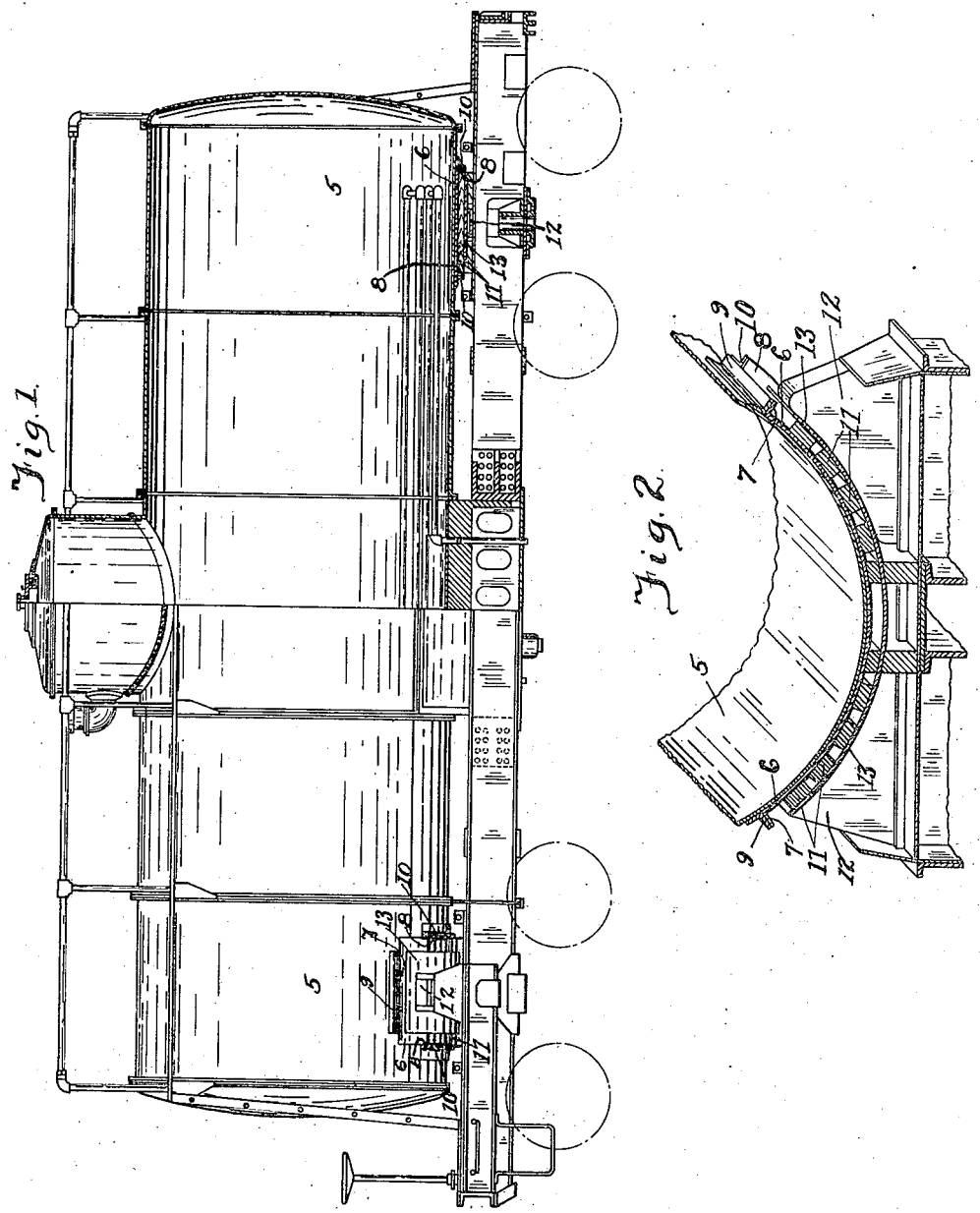
Edward D. Levy
Henry W. Jacobs, Inventors
By Heidman & Street, Attorneys

UNITED STATES PATENT OFFICE.

EDWARD D. LEVY, OF SPRINGFIELD, MISSOURI, AND HENRY W. JACOBS, OF TOPEKA, KANSAS.

TANK-CAR.

1,251,978. Specification of Letters Patent. Patented Jan. 1, 1918.

Application filed April 23, 1917. Serial No. 163,808.

*To all whom it may concern:*

Be it known that we, EDWARD D. LEVY and HENRY W. JACOBS, citizens of the United States, and residents of Springfield, in the county of Greene and State of Missouri, and of Topeka, in the county of Shawnee and State of Kansas, respectively, have invented certain new and useful Improvements in Tank-Cars, of which the following is a description, reference being had to the accompanying drawing, which forms a part of our specification.

Our invention relates more particularly to the bearings or expansion pads for tank cars employed in the shipment of hydrocarbon oil; and has for its object the provision of a bearing or pad adjacent each end of the tank whereby the tank is so supported on and connected with the cradles of the car-underframe as to permit expansion and contraction of the tank; the invention contemplating expansion pads or bearings which may be readily renewed, and whereby the tank-shell will not only be reinforced, but all wear, incident to movement between the tank-shell and the cradles of the underframe, will be taken up by the pad or bearing.

A further object of our invention is to provide an expansion pad or bearing of such construction that the same will have controlling relation with the tank without the necessity of perforating the walls of the tank for rivets, studs or bolts, to secure the expansion bearing or pad to the tank; the invention, therefore, providing a construction wherein the possibility of leaks resulting from the use of rivets, bolts and the like is eliminated.

The advantages of our invention will be readily apparent from a detailed description of the accompanying drawing wherein:—

Figure 1 is a partial side elevation and partial longitudinal sectional view of a tank car provided with our improved expansion bearings or pads.

Fig. 2 is a detail perspective view of the tank-cradle and a portion of the tank-shell with our improved bearing or pad shown in cross-section.

In the particular exemplification of the invention, the tank car is shown composed of transversely disposed sections secured together on the exterior of the tank, but it will be readily understood that the invention is applicable for use on the ordinary or plain barreled tank-car at present employed.

In the drawing, Fig. 2, 5 represents a portion of the tank-shell, beneath which is provided a sheet metal member 6 shaped to conform with the contour of the lower portion of the tank with which it contacts. The member 6 is formed of a rectangular sheet of metal; the two sides and two ends, or portions thereof, being preferably flanged outwardly, as shown at 7 in Fig. 2, and at 8 in Fig. 1; the flanges 7 and 8 being formed either throughout the entire or a portion of the sides and ends, see Fig. 1; and the flanges are so formed as to be disposed perpendicular to the surface of the tank-shell or wall.

The tank, at points coincident with the ends and sides of the plate or member 6, is provided with the angle-irons 9 and 10. These angle-irons are preferably secured to the tank by welding so as to obviate the use of rivets or bolts which are apt to cause leaks. The angle-irons 9 are disposed lengthwise of the tank, with one leg of the angle arranged flush with the flanged side 7 of the member or plate 6, while the angle-irons 10 are disposed transversely of the tank with one leg of the angle disposed outwardly and flush with the flanged ends 8 of the plate or member 6.

As is evident from the construction shown and described, the position of the tank, relative to the member or plate of the expansion-pad or bearing, will be maintained by reason of the coacting flanges and angle-irons arranged at both ends and both sides of the expansion pad or bearing-plate; and, if desired, the flanges 7 and 8, of the plate or member 6, may be bolted or riveted to the respective angle-irons 9 and 10. This construction will prevent a slipping or shifting relation between the tank and members or plates 6 of the expansion pads and therefore will obviate wear on the tank-shell at this point and confine it to the outer surface of the plate or member 6, due to its contact with the filling blocks, shown at 11 in Fig. 2. The filling blocks 11 are preferably made of hard wood so as to provide resiliency as well as a deadener for the sound that would result by putting metal to metal.

The cradles 12, secured to the car-underframe in the usual manner, are each provided on the upper surface with a sheet metal member or plate 13, preferably of greater width than the cradle-proper, so as to provide a comparatively large bearing-surface for a filling member or block 11; and the member or plate 13 may be secured to its respective cradle in any suitable manner.

With our improved construction, if it is desired to replace the expansion plate or member 6 by reason of excessive wear, this may be readily accomplished by merely jacking up the tank until it clears the cradle, thus allowing the member or plate 6 to drop from between the various angle-irons. Where the angle-irons and the flanges of the plate have been secured together by bolts or rivets, the bolts or rivets must, of course, first be removed, which will permit the plate to drop away from the bottom of the tank.

Instead of employing the wood filler blocks, other material may be employed which will provide the desired resiliency and deadening effect obtainable with the hard wood fillers shown and described.

We have shown and described what we believe to be the simplest and best form of our invention, but the same may be modified in certain details of construction without, however, departing from the spirit of our invention.

What we claim is:—

1. In combination with a tank-car and the cradle therefor, an expansion bearing comprising a member interposed between the tank and the cradle, and means intermediate of said member and the tank-shell whereby movement of the member relative to the tank is prevented and frictional contact confined to the outer surface of said member.

2. In combination with a tank-car and the cradle therefor, a bearing member interposed between the under side of the tank and the cradle, provided with engaging surfaces at its sides and ends, and means on the tank-shell adjacent the sides and ends of said member and in engagement with said engaging surfaces whereby movement of the tank, relative to said member, is prevented and wear, incident to movement on the cradle, taken up by said member.

3. In combination with a tank-car and the cradle therefor, a bearing member provided with outwardly disposed flanges on the sides and ends thereof, said bearing member being interposed between the tank and the cradle, and means on the tank-shell adjacent the sides and ends of said member and provided with surfaces correlated with the flanges on said member whereby movement of the tank, relative to said member, is prevented and wear, incident to movement on the cradle, taken up by said member.

4. The combination of a tank-car, the shell whereof, at points on the under side adjacent the ends, is provided with projections, and a cradle on the car underframe adjacent the ends of the shell, with a bearing-plate conforming with the contour of the tank-shell, interposed between the tank and the cradle, and having outwardly disposed surfaces at the sides and ends thereof adapted to engage with the projections on the tank-shell so as to prevent movement of the tank relative to said member.

5. The combination of a tank-car and its supporting cradles, with a bearing-plate, interposed between the tank-shell and each cradle, provided with outwardly presented flanges on the four sides thereof, and means secured to the tank-shell and in abutting relation with the flanges on said plate whereby movement of the tank, relative to said plate, is prevented.

6. The combination of a tank, a supporting cradle therefor, with a bearing plate shaped to conform with the contour of the lower part of the tank-shell, means intermediate of the sides of said plate and the tank-shell whereby movement of the tank, relative to said plate, is prevented, and cushioning means intermediate of said plate and the cradle.

7. In a tank car, the combination of a tank-shell, a supporting cradle, a bearing plate provided with outwardly disposed flanges on its four sides, means secured to the tank-shell adjacent said plate and having abutting relation with the flanges thereof so as to prevent sliding movement between the tank-shell and said plate, with cushioning means interposed between said plate and the cradle.

8. In a tank car, the combination of the tank, a supporting cradle, with a bearing member interposed between the tank-shell and the cradle, conforming with the lower contour of the tank-shell and removably secured thereto so as to prevent longitudinal and transverse movement of the tank relative to said member.

9. A tank car, comprising a metal tank having expansible relation at its ends with the car-underframe, expansion pads comprising a rectangular metal plate conforming with the contour of the tank-shell and disposed intermediate of the tank and the underframe, said plate being provided with outwardly disposed flanges on its four sides, and angle members secured to the tank-shell and in abutting relation with the flanges of said plate whereby movement of the tank relative to said plate is prevented.

10. A tank car, comprising a metal tank fixedly secured at its center to the car underframe and in expansible relation therewith at its ends, expansion pads comprising rectangular metal plates conforming with the contour of the tank-shell and located intermediate of the tank and the underframe, the tank and said plate being provided with correlated surfaces having abutting relation whereby longitudinal and transverse movement of the tank, relative to said plates, is prevented and expansion of the tank permitted, cradles secured on the underframe adjacent the ends of the tank, said cradles being provided with enlarged upper surfaces, and resilient means interposed between said surfaces of the cradles and said plates.

11. A tank car, comprising a metal tank, supporting cradles on the car underframe adjacent the ends of the tank, bearing plates secured on the upper surfaces of said cradles, expansion plates conforming with the contour of the under side of the tank, the tank and said expansion plates being provided with correlated surfaces whereby movement of the tank, relative to said plate, is prevented and expansion of the tank permitted, and resilient means interposed between the bearing plates on the cradles and said expansion plates.

EDWARD D. LEVY.
HENRY W. JACOBS.

Witnesses:
N. A. STREET,
F. A. FLORELL.